(12) United States Patent
Chavan

(10) Patent No.: US 8,204,873 B2
(45) Date of Patent: Jun. 19, 2012

(54) SYSTEM AND METHOD FOR QUERY EXPRESSION OPTIMIZATION

(75) Inventor: Shasank K. Chavan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 315 days.

(21) Appl. No.: 12/548,352

(22) Filed: Aug. 26, 2009

(65) Prior Publication Data

US 2011/0055197 A1 Mar. 3, 2011

(51) Int. Cl.
*G06F 7/00* (2006.01)
*G06F 17/30* (2006.01)
(52) U.S. Cl. ........................ 707/713; 707/758
(58) Field of Classification Search .................. None
See application file for complete search history.

(56) References Cited

U.S. PATENT DOCUMENTS

| | | | | |
|---|---|---|---|---|
| 5,210,870 A * | 5/1993 | Baum et al. | 707/752 |
| 5,590,362 A * | 12/1996 | Baum et al. | 1/1 |
| 5,619,713 A * | 4/1997 | Baum et al. | 1/1 |
| 5,987,455 A * | 11/1999 | Cochrane et al. | 1/1 |
| 6,032,143 A * | 2/2000 | Leung et al. | 1/1 |
| 6,947,934 B1 * | 9/2005 | Chen et al. | 1/1 |
| 6,986,131 B2 * | 1/2006 | Thompson et al. | 717/160 |
| 7,213,012 B2 * | 5/2007 | Jakobsson et al. | 1/1 |
| 7,716,210 B2 * | 5/2010 | Ozcan et al. | 707/713 |
| 2003/0212694 A1 * | 11/2003 | Potapov et al. | 707/100 |
| 2003/0233643 A1 * | 12/2003 | Thompson et al. | 717/161 |
| 2005/0004892 A1 * | 1/2005 | Brundage et al. | 707/3 |
| 2005/0086202 A1 * | 4/2005 | Cheng et al. | 707/2 |
| 2006/0282423 A1 * | 12/2006 | Al-Omari et al. | 707/4 |
| 2008/0114975 A1 * | 5/2008 | Yen | 712/233 |
| 2010/0169381 A1 * | 7/2010 | Faunce et al. | 707/797 |

\* cited by examiner

*Primary Examiner* — Kuen Lu
*Assistant Examiner* — Tuan A Pham

(57) ABSTRACT

A method provided for optimizing a query expression on a database engine of a database server. The query expression is sent to the database engine. The query expression contains a plurality of query language elements. The database engine initiates query processing of the query expression. An evaluation counter within the database engine increments an evaluation counter value corresponding to a query language element result. A flag is set within the database engine when the evaluation counter value reaches a threshold value. The database engine can then evaluate the efficiency of the query language elements in the query expression by comparing the evaluation counter value for each query language element against a set of optimization criteria.

15 Claims, 10 Drawing Sheets

| Basic Predicate Group | Block | Cost |
|---|---|---|
| c = a/b | bk1 | 314 |
| bignum1 < 20 | bk2 | 104 |
| a > b | bk3 | 2 |

| Basic Predicate Group | Block | Cost |
|---|---|---|
| c = a/b | bk1 | 314 |
| (a > b AND bignum1 < 20) | bk2, bk3 | 106 |

| Predicate | Cost | Seen Count | Taken Count | Efficiency |
|---|---|---|---|---|
| a < b | 1 | 100 | 20 | 20 |
| b > c | 1 | 80 | 70 | 70 |
| a = c | 1 | 10 | 9 | 9 |

FIG. 14

| Predicate | Cost | Seen Count | Taken Count | Efficiency |
|---|---|---|---|---|
| Bignum1 > 20 | 104 | 2000 | 1900 | 18 |
| a < b | 1 | 100 | 20 | 20 |
| b > c | 1 | 80 | 70 | 70 |
| a = c | 1 | 10 | 9 | 9 |

FIG. 15

| Predicate | Cost | Seen Count | Taken Count | Hit-Ratio | Efficiency |
|---|---|---|---|---|---|
| Bignum1 > 20 | 104 | 2000 | 1900 | 95% | 18 |
| b > c | 1 | 80 | 70 | 88% | 70 |
| a < b | 1 | 100 | 20 | 20% | 20 |
| a = c | 1 | 10 | 9 | 90% | 9 |

FIG. 16

| Predicate | Cost | Seen Count | Taken Count | Hit-Ratio | Efficiency |
|---|---|---|---|---|---|
| Bignum1 > 20 | 104 | 2000 | 1900 | 95% | 18 |
| b > c | 1 | 100 | 88 | 88% | 88 |
| a < b | 1 | 12 | 3 | 25% | 3 |
| a = c | 1 | 9 | 9 | 100% | 9 |

FIG. 17

| Predicate | Cost | Seen Count | Taken Count | Hit-Ratio | Efficiency |
|---|---|---|---|---|---|
| Bignum1 > 20 | 104 | 2000 | 1900 | 95% | 18 |
| (b > c OR a < b OR a = c) | 2 | 100 | 100 | 100% | 50 |

FIG. 18

| Predicate | Cost | Seen Count | Taken Count | Hit-Ratio | Efficiency |
|---|---|---|---|---|---|
| Bignum1 > 20 | 104 | 2000 | 1900 | 95% | 18 |
| b > c | 1 | 100 | 70 | 70% | 70 |
| a < b | 1 | 30 | 20 | 66% | 20 |
| a = c | 1 | 10 | 9 | 90% | 9 |

FIG. 19

SYSTEM AND METHOD FOR QUERY EXPRESSION OPTIMIZATION

BACKGROUND

Databases are used to store and retrieve data. Data is retrieved through a data request called a query. The retrieved data can be selected, sorted, and organized based on the query. Query expressions may contain many arguments or the arguments may use large tables, both of which may require extensive query processing. Query expression evaluation can be a performance critical component of a database system. Optimizing the execution of queries can be important in improving database performance. Typical query optimizing compilers use static analysis at compile time to attempt to generate efficient execution plans. However, the actual runtime behavior can vary significantly from the compile time execution plan projections. The runtime behavior of these plans may be poor because the data processed during actual query execution could have values and characteristics which were not factored into the compiler's analysis during plan generation.

Table statistics may be collected and used by the compiler to generate plans more sensitive to the data being processed, but if the table was modified between compiling the table statistic and running the query, this may result in poor execution plans. Table statistics may generate execution plans which target the expected dataset to be processed. But generating statistics can have some drawbacks. First, generating statistics typically requires user intervention in the form of a database or SQL command to update the statistics. Second, generating statistics may use intensive computations on the database system which can add an extra load to the system, and can be even more costly if done automatically during periods of heavy workloads on the system. Third, statistics can be stale and not represent actual data being queried. For example, if rows have been modified, the cached statistics would not account for the modification, leading to inaccurate analysis during plan generation. But even when the statistics are up-to-date, table statistics can still be incomplete. Typically only a small percentage of a table's rows are sampled when gathering statistics. The data collected may not be enough to determine selectivity patterns for predicates involved in complex queries.

BRIEF DESCRIPTION OF THE DRAWINGS

FIG. 14 is an illustration of a table of predicate statistics evaluated in a specified order with their taken counter values, seen counter values, and efficiency values in accordance with an embodiment;

FIG. 15 is an illustration of a table of predicate statistics evaluated in a specified order with their taken counter values, seen counter values, cost values, and efficiency values in accordance with an embodiment;

FIG. 16 is an illustration of a table of predicate statistics reordered in a specified order with their taken counter values, seen counter values, cost values, hit-ratios, and efficiency values in accordance with an embodiment;

FIG. 17 is an illustration of a table of predicate statistics reordered in a specified order with their taken counter values, seen counter values, cost values, hit-ratios, and efficiency values in accordance with an embodiment;

FIG. 18 is an illustration of a table of predicate statistics evaluated in a specified order with their taken counter values, seen counter values, cost values, and efficiency values in accordance with an embodiment;

FIG. 19 is an illustration of a table of predicate statistics evaluated in a specified order with their taken counter values, seen counter values, cost values, and efficiency values in accordance with an embodiment.

DETAILED DESCRIPTION

Figure 1:
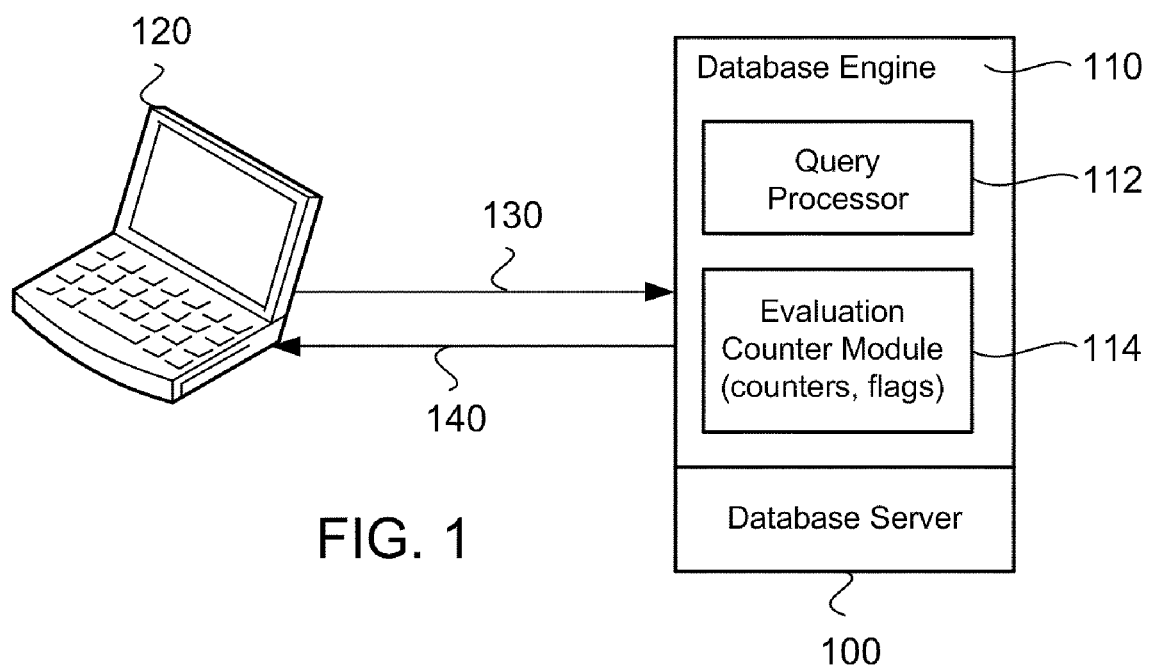
FIG. 1 is an illustration of sending a query to a database and an optimized result returned from the database in accordance with an embodiment.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

In FIG. 1, a user on a calling device or user device 120 may send a query 130 in the form of a query expression to the database engine 110 on the database server 100. The database engine may process the query expression using a query processor 112, and return a result 140 to the user device. Optimizing the processing of the query expression may shorten the duration of time between sending a query and receiving a result.

Query expression optimization may include dynamic optimization of a query execution from query information or statistics that can be generated during the execution of the query. Dynamic optimization may include an evaluation counter value that can count the occurrences of an evaluation of query language elements. The evaluation counter value can be incremented by an evaluation counter module 114 within a database engine 110 according to a query language element result. A flag, a threshold limit, or a trigger mechanism may be activated at some point in query execution or after a specified number of rows have been processed in order to analyze the evaluation counter and optimize the query. Dynamic query optimization can include dynamic predicate reordering, fast null processing, run-time constants optimization, indirect branch optimization, and other optimizations of queries using query language elements. Query language elements can include predicates, nulls, columns, constants, indexes, keys, sub-queries, expressions, and other elements that may be defined, counted, and/or produce a specified result in a query language.

In one example embodiment, dynamic predicate reordering may optimize the query using the predicate as the query language element. Predicates can be elements that determine an answer to a question about a value or group of values. A predicate can return a TRUE, a FALSE, or if the question cannot be answered, an UNKNOWN value. Dynamic predicate reordering can be an optimization which rearranges the evaluation order of predicates in a query expression based on one or more efficiency calculations.

An efficiency calculation can be derived from cost, frequency, or both. Cost can be the time taken to evaluate a particular predicate or predicate operation. Frequency can be the likelihood that a predicate may be selected whereupon expression evaluation for the given row terminates. For example, the frequency or selectivity of each predicate can be determined using profile counters for the predicates in PCode instructions. PCode can be generic low-level interpreted code that can use an interpreter to execute. PCode can be analogous to Complex Instruction Set Computer (CISC) instructions from microprocessors in which each instruction can execute one or more low-level operations or machine level operations. The cost of a predicate can be derived by weights associated with each PCode instruction. A MULTIPLY may have a heavier CPU cost than an ADD, but the MULTIPLY may be less than the cost of a DIVIDE.

The profile counters may set a flag to stop query evaluation after a threshold value or trigger limit is reached. The predicates may be reordered based on efficiency calculations. Once optimizations are performed, the newly optimized PCode instructions may be written back into the expression, and query execution may resume. The next row processed by the expression may get evaluated by the newly generated PCode instructions. Runtime optimizations can be performed again when another trigger limit is reached. The trigger limit can be reset by the optimization framework based on patterns seen from the profiling data.

In another dynamic query optimization embodiment, fast null processing may optimize the query using the column and/or the null as the query language element. Queries operating on nullable columns may spend extra processing time during expression evaluation to determine if the column has a NULL value or not. Checking each bit or expression in a nullable column individually can consume unnecessary time in processing, but evaluating the entire column or segments of the column in one operation or set of operations can be significantly faster than evaluating each row of the column separately.

For example, columns A through Z may be nullable. For each column, a single bit may exist that represents a column when a column is NULL or not (i.e. 1 or 0). Nullable bits for columns may be adjacent to each other in memory. In the example of 26 columns (A-Z), the nullable bits may be represented by a single 32-bit (word) memory location. If 26 columns are involved in an expression (e.g. SELECT 1 FROM TABLE1 WHERE (a<1) or (b<1) or ... or (z<1)), then 26 individual bit tests may be used pre-optimization.

Fast null processing optimization used to improve query expression performance can be to reduce the amount of time spent processing nullable columns by doing a single check for NULL columns against columns likely to be NOT-NULL. Profile data may be collected at runtime in NOT_NULL_BRANCH instructions (similar to BRANCH_AND_CNT instructions in dynamic predicate reordering discussed later) that can indicate whether the branch was taken (i.e. the column was NOT NULL) or not taken (i.e. the column was NULL). When a threshold limit is reached, the database engine may analyze columns likely to have a NOT NULL value. In the example with A-Z columns, columns A-E may be known to be NOT NULL most of the time. With the analysis, a new instruction (NOT_NULL_BRANCH_BULK) may be given that performs a bit-wise AND instruction with a mask value determined by the analysis and the 32-bit container representing the nullable bits for a row. If the result of the bit-wise AND instruction using the mask is 0, the implication can be that the columns may be NOT-NULL, and other nullability checks for columns A-E can be skipped. Fast null processing may use profiling data obtained and gathered during runtime query evaluation to change the query expression, so that subsequent rows may process faster through an optimized expression.

In another dynamic query optimization configuration, runtime-constant optimization may optimize the query by substituting a constant value in an expression as the query language element when variables in the expression have a high probability of being a consistent value or a constant value. For example, a query may include two predicates shown in query Q1.

SELECT 1 FROM TABLE2 WHERE $A<(B*B*B*B)$
 OR $A>(B*B*B)$ [Q1]

A runtime-constant optimization may use runtime profiles to determine the "B's" likely value across the rows of TABLE2, and then optimize accordingly. "B" may have the value of 10 for 90% of the rows seen by a query. The framework may add a "counter" to column "B" that tracks the top values "B" across the rows evaluated. When a trigger is reached, "B" may be determined to be 10 most of the time. As a result the evaluation, the query Q1 may be rewritten to query Q2.

SELECT 1 FROM TABLE2 WHERE
 A < (CASE WHEN B = 10 THEN 10000 ELSE B*B*B*B) OR
 A > (CASE WHEN B = 10 THEN 1000 ELSE B*B*B) [Q2]

The overall evaluation time of the expressions and query may be improved by not performing the sequence of multiplies for 90% of the rows processed having B=10.

In another dynamic query optimization embodiment, indirect branch optimization may optimize the query using predicates as the query language element in an approach different from dynamic predicate reordering. A query may be represented by query Q3.

SELECT CASE WHEN A = 1 THEN 'one'
 WHEN A = 2 THEN 'two'
 WHEN A = 3 THEN 'three'
 WHEN A = 4 THEN 'four'
 WHEN A = 5 THEN 'five'
 ELSE 'unknown'
FROM TABLE3 [Q3]

For example, the expression may evaluate query Q3 and when A=1, then the query engine may return 'one'. Otherwise, the expression may continue to evaluate the query Q3 and evaluate A=2. When A=2, then the query engine may return 'two,' and so forth the rest of the case statement. When a case statement is long with N different cases, the query may evaluate N/2 cases on average. Creating an indirect branch that can hash the value of "A" and index the value into a "lookup table" can optimize query Q3. The table may be used to determine a branch. Instead of running query Q3 as written, the query can run the steps of sequence SEQ1 for each row.

---

HASH (a)
Index hash value into LOOKUP-TABLE and get "location"
BRANCH "location" [SEQ1]

---

Sequence SEQ1 may have a relatively constant query evaluation time, meaning the time to evaluate Q3 may be substantially constant regardless of the number of cases used in the query and may not vary significantly with the number of cases. Once the initial cost in evaluation time for the three branch instructions (HASH, LOOKUP-TABLE, and BRANCH) is made the evaluation time of the case statement may be minimal.

Because of the initial cost or the potential high upfront cost of three branch instructions, running sequence SEQ3 may take longer than case statement evaluation if query Q3 evaluates to a result in the first couple of cases. A runtime profile may count the number of predicates or cases used before returning a result. After a threshold number of rows are evaluated, an indirect branch optimization process may determine when a query may benefit from indirect branch optimization. In other words, the branch instruction substitute for the case statement outweighs the cost of the upfront processing time used in the branch instructions and indirect branch optimization can be performed. The runtime profiles can be used too when the seek time is closer to the expected average, and when an indirect branch optimization can be performed.

An evaluation counter and a flag in dynamic query evaluation may be used in various dynamic query optimization methods. A sample of dynamic query optimization methods using an evaluation counter and a flag are briefly described and include dynamic predicate reordering, fast null processing, run-time constant optimization, indirect branch optimization. Additional details about the evaluation counter and the flag used for dynamic query optimization can be illustrated using the dynamic predicate reordering embodiments provided below.

Predicates in a Query

A query expression may include sub-expressions that are connected to each other with logic or Boolean operators, such as AND and OR. Each of these sub-expressions, referred to as predicates, may be evaluated independently of the other sub-expressions. Predicates may be combined together to form predicate groups. Each predicate may be evaluated to a Boolean TRUE or FALSE value. The predicates of the query expression or scan expression may not have to be evaluated in any particular order.

Figure 2:
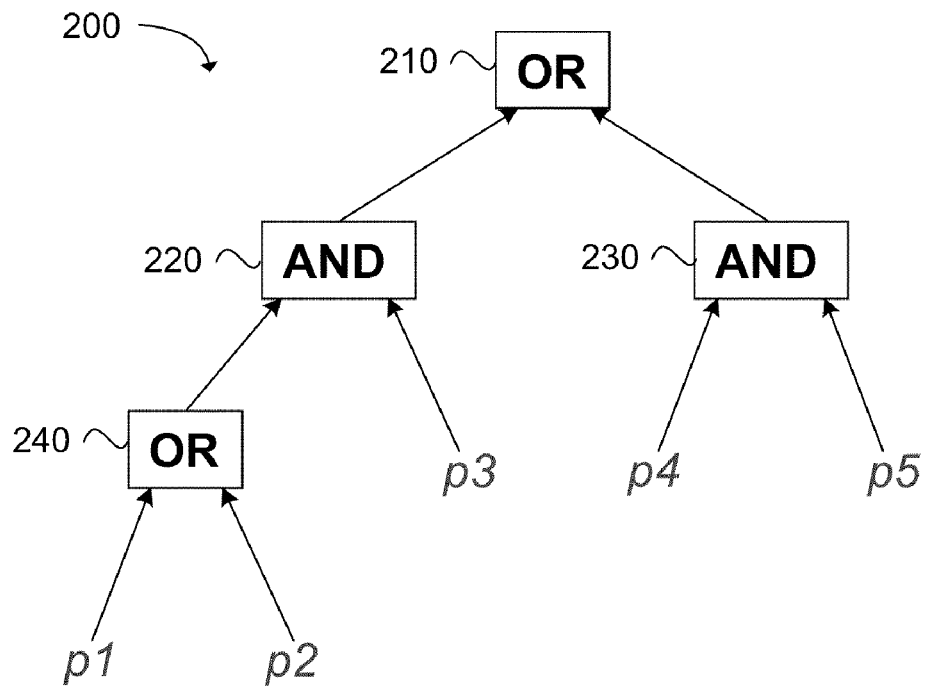
FIG. 2 is a block diagram illustrating predicate ordering in accordance with an embodiment.

FIG. 2 provides an illustration of a query expression QE1 200 that may include predicates p1, p2, p3, p4, and p5.

$$((p1 \text{ OR } p2) \text{ AND } p3) \text{ OR } (p4 \text{ AND } p5) \quad [QE1]$$

A query expression may be evaluated until a definitive result is reached. If a definitive result can be reached without evaluating a predicate, then the remaining unevaluated predicate(s) may be skipped. For example in QE1, if the p1 predicate returns a TRUE, the query processor may not evaluate the p2 predicate in the predicate group "p1 OR p2" because the result of the predicate group "p1 OR p2" may be TRUE regardless of the value of p2. If p3 returns a TRUE with p1 being TRUE, the query expression definitively results in TRUE without the necessity of evaluating p2, p4, and p5, because the results of p2, p4, and p5 may not change the TRUE result of the query expression. Typically predicates may be evaluated in the order presented in the query expression. In another example, if both p4 and p5 were evaluated first and return a TRUE, QE1 would result in a TRUE without the necessity of evaluating p1, p2, and p3. Skipping predicates in reaching a definitive result may be called an early exit and reduce the predicate processing time.

In QE1, "(p1 OR p2) AND p3" and "p4 AND p5" may be sub-expressions, branches, predicate groups, units, or parent predicates of the QE1 expression. "(p1 OR p2) AND p3" and "p4 AND p5" may be sibling predicates to each other. The p4 and p5 predicates may be child predicates or branches of the parent predicate "p4 AND p5", and the p3 predicate and "p1 OR p2" unit may be child predicates or branches of the parent predicate "(p1 OR p2) AND p3". The p4 and p5 predicates may be sibling predicates to each other, and p3 and "p1 OR p2" may be sibling predicates to each other. The p1 and p2 predicates may be child predicates or branches of the parent predicate "p1 OR p2". The p1 and p2 predicates may be sibling predicates to each other. The ordering of sibling predicates may be interchangeable without changing the result. Sibling relationships can be defined and reordered to preserve commutativity. Boolean logic and Boolean algebra, such as De Morgan's laws, may be used to maintain the equality in the result when reordering parent, child, and sibling predicates.

Branch predication can be used in computer architecture design, including database design, for mitigating the costs usually associated with conditional branches. Conditional branches can be implemented for logic operators, such as ANDs and ORs, in query expressions. Branch predication allows each instruction to conditionally either perform an operation or evaluate a predicate or do nothing on another predicate. Doing nothing on a high cost predicate or a low efficiency predicate may optimize the evaluation of a query expression.

Figure 3:
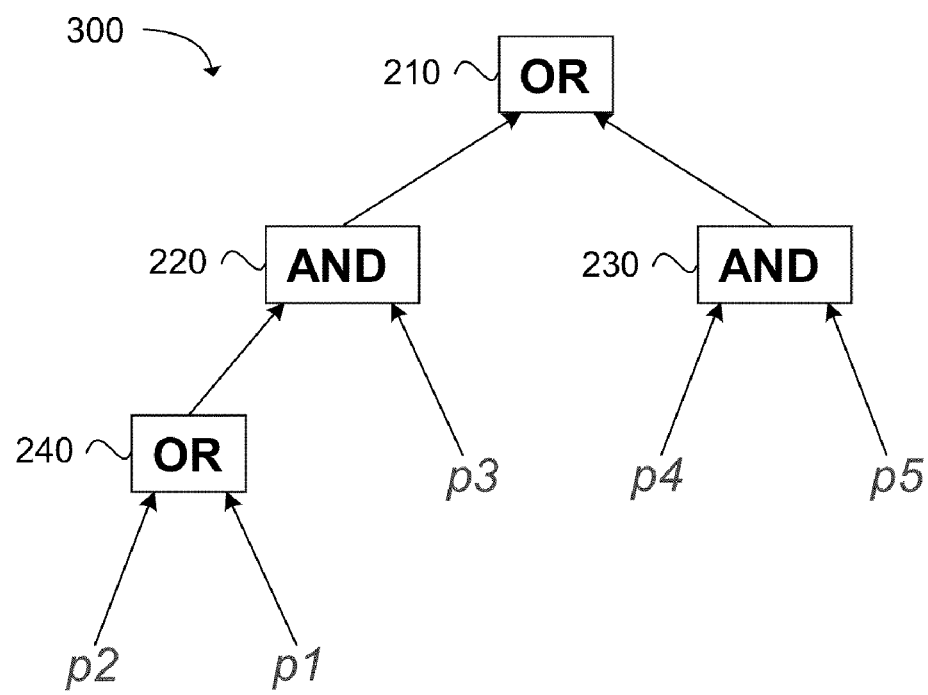
FIG. 3 is a block diagram illustrating predicate reordering in accordance with an embodiment.

Continuing with the example of QE1, if the efficiency of predicates in QE1 can be represented by p5>p4>p3>p2>p1 and p3>(p1 OR p2) and (p4 AND p5)>((p1 OR p2) AND p3), where p5 has a greater efficiency than p4, and p4 has a greater efficiency than p3, and so forth. A child predicate may be reordered before a parent predicate. In another embodiment, a first evaluated predicate may be compared with the next sibling for reordering. As illustrated in FIG. 3, the query expression QE1 200 (FIG. 2) may be transformed into QE2 300. In QE2, the higher efficiency p2 sibling of p1 may be evaluated before the lower efficiency p1 by ordering p2 before p1 in the OR operation 240.

$$((p2 \text{ OR } p1) \text{ AND } p3) \text{ OR } (p4 \text{ AND } p5) \quad [QE2]$$

Figure 4:
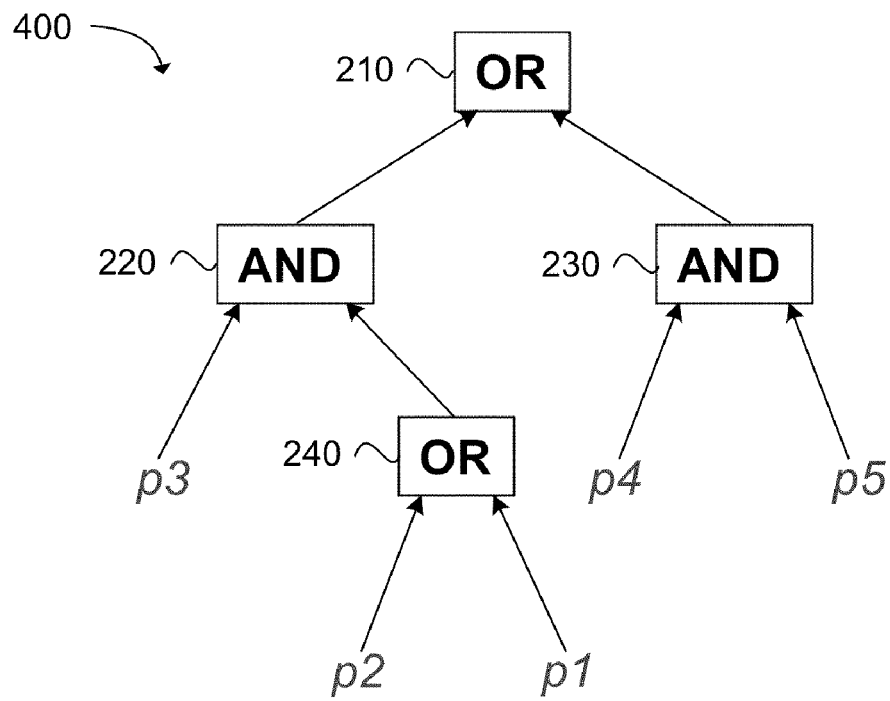
FIG. 4 is a block diagram illustrating predicate reordering in accordance with an embodiment.

In FIG. 4, the query expression QE2 300 (FIG. 3) may be transformed into QE3 400. In QE3, the higher efficiency p3 sibling of "p2 OR p1" may be evaluated before the lower efficiency "p2 OR p1" by ordering p3 before "p2 OR p1" in the AND operation 220.

$$(p3 \text{ AND } (p2 \text{ OR } p1)) \text{ OR } (p4 \text{ AND } p5) \quad [QE3]$$

Figure 5:
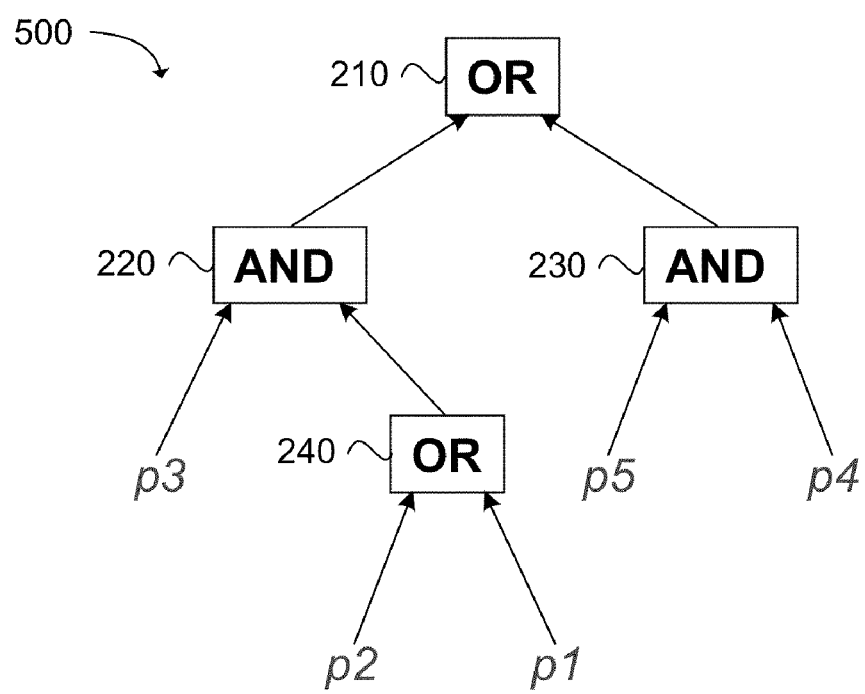
FIG. 5 is a block diagram illustrating predicate reordering in accordance with an embodiment.

In FIG. 5, the query expression QE3 400 (FIG. 4) may be transformed into QE4 500. In QE4, the higher efficiency p5 sibling of p4 may be evaluated before the lower efficiency p4 by ordering p5 before p4 in the AND operation 230.

$$(p3 \text{ AND } (p2 \text{ OR } p1)) \text{ OR } (p5 \text{ AND } p4) \quad [QE4]$$

Figure 6:
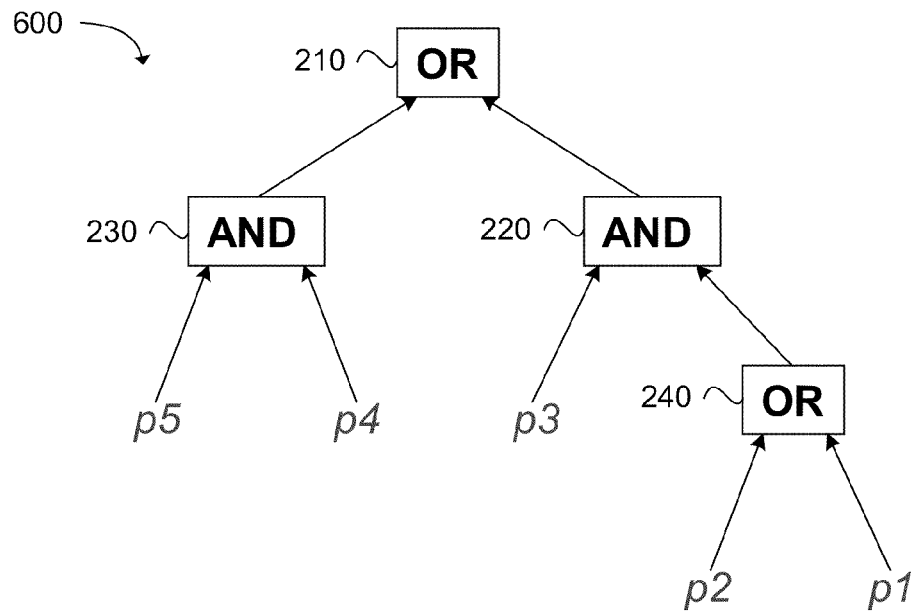
FIG. 6 is a block diagram illustrating predicate reordering in accordance with an embodiment.

In FIG. 6, the query expression QE4 500 (FIG. 5) may be transformed into QE5 600. In QE5, the higher efficiency "p5 AND p4" sibling of "p3 AND (p2 OR p1)" may be evaluated before the lower efficiency "p3 AND (p2 OR p1)" by ordering "p5 AND p4" before "p3 AND (p2 OR p1)" in the OR operation 210. The query expression QE5 may be a more efficient ordering of the query expression QE1, resulting in less evaluation time on a query expression returning an equivalent result.

(p5 AND p4) OR (p3 AND (p2 OR p1))　　　　　　[QE5]

In another configuration, the cost of predicates in QE1 may be represented by p5>p4>p3>p2>p1 and p3>(p1 OR p2) and (p4 AND p5)>((p1 OR p2) AND p3). If predicates are ordered by cost, the reordered query expression may produce a similar result to the predicate ordering of efficiency.

Dynamic Reordering

Each predicate may have a different runtime cost, which can be the duration of time that the database engine uses to evaluate a predicate. For example, a string computation instruction may have a high cost, whereas a DIV ("/") and MUL ("*") instruction may have a medium cost, and a compare like EQ ("="), GT (">"), or LT ("<") may have a low cost. The query expression evaluation time may be reduced or optimized by evaluating predicates with shorter runtime durations (or predicates with lower costs) first, and evaluating and possibly skipping the predicates with longer runtime durations (or predicates with higher costs) last. Running lower cost predicates first may take advantage of the early exit or faster short-circuiting of query expressions. Rearranging or reordering predicate evaluation order based on the cost of evaluating each predicate may be called static reordering because reordering may use data generated prior to the execution of the query.

A query expression can be run recursively for specified elements on each row of a specified database table. For a particular table some predicates may return a greater number of TRUE results than FALSE results. Running predicates with a greater probability of TRUE results first where predicates in the query expression are joined by an OR operator may result in an early exit with a TRUE result. Running predicates with a greater probability of FALSE results first where predicates in the query expression are joined by an AND operator may result in an early exit with a FALSE result. When an evaluated predicate results in a greater probability than other predicates of an early exit due to reaching a predetermined result, such as TRUE or FALSE, from a query expression or predicate, the predicate may have a high efficiency. Rearranging or reordering predicate evaluation order based on the efficiency of each predicate may be called dynamic reordering because reordering may use data generated during the execution of the query.

Dynamic reordering or dynamic optimization may occur when a user's query is sent to the database engine of a database server in real-time or runtime, as opposed to providing optimizations at compile-time. Dynamic reordering may be performed at runtime or compile time, but a compile time query may be a database developer's test or sample query, not an actual user query. The database engine may receive the query and evaluate the query expression in the query. The query expression may include a plurality of predicates. The database engine may initiate query processing of the query expression.

Instrumented Code and Counters

The database engine may use an intermediate code, like PCode, to process or evaluate the query expression. The intermediate code may be interpreted by an evaluation engine. Instrumented code or instrumented PCode instructions may be used to collect profiling information about the query while the query is running. Collecting the profile may include counting each pass in a logical branch associated with a predicate in the query expression. After a predetermined number of expression evaluations, such as a number rows evaluated in a database table, the database engine may reorder the predicates based on predicate efficiency, predicate cost, or a combination of predicate efficiency and predicate cost.

A database system may generate expressions in terms of some intermediate code, such as PCode, which may get interpreted by an evaluation engine at runtime. Other database systems may generate machine code or code compiled in "native" expressions which can be executed without interpretation. Native expression performance can be improved by using profile-guided optimizations (PGO) provided by programming language compilers.

In another configuration, a database system compiles queries into expressions containing intermediate code, such as PCode, that gets interpreted at runtime. A PCode instruction set typically consists of arithmetic, logical, compares, moves, branches, and a variety of other operations used to manipulate columns of rows in a database environment. The instruction set may be similar to a CPU instruction set. An expression generated from a database query compilation may contain a sequence of PCode instructions. The instructions may be interpreted in an expression evaluation engine when the query executes.

The database compiler may be modified to generate instrumented PCode instructions which can collect profiling information at runtime during query evaluation. For example, branch instructions may be modified to capture flow behavior. Counters may be maintained for the instructions of the predicates to track how often a branch was seen and how often the branch was taken. Counters may be incremented to collect data on a control flow for a particular branch in the control flow. Analyzing the counters during a runtime optimization phase can help determine a typical execution flow taken for all the rows processed by that expression.

A counter may be associated with each predicate in the query expression. A first counter, referred to as a seen-counter, may be incremented every time a predicate is evaluated or entered for evaluation. A second counter, referred to as a taken-counter, may be incremented every time a predicate takes a branch as a result of the predicate evaluation, or in other words, when the predicate evaluation results in a predetermined outcome, like a TRUE or FALSE. A TRUE result can result in taking a first branch and a FALSE result can result in taking a second branch. When an expression counter or evaluation counter value reaches a threshold value or trigger value, a flag may be set, so the database engine can be alerted to perform predicate reordering or query expression optimization. A taken-counter, seen-counter, and trigger value flag may be runtime components used to transform query expressions based on the behavior of the data processed by the query in real-time.

Figure 7:
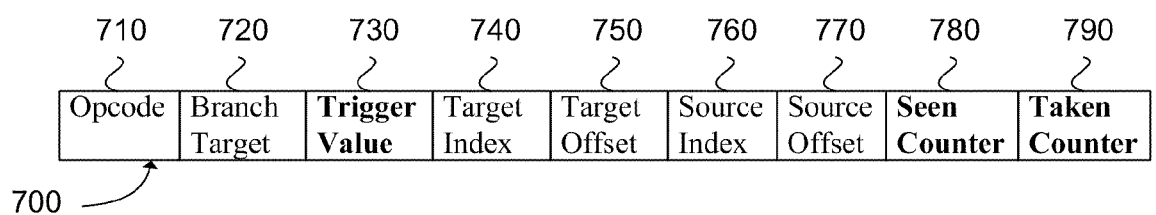
FIG. 7 is a block diagram illustrating a branch PCode format in accordance with an embodiment.

As illustrated in FIG. 7, an operation format 700 for branching instructions may include the seen-counter 780, taken-counter 790, and trigger value 730 and may be implemented using instrumented code. The operation format may include an opcode 710, a branch target 720, a target index 740, a target offset 750, a source index 760, and a source offset 770. An operation using the operation format may be a PCode BRANCH_AND_CNT or BRANCH_OR_CNT instruction to replace an existing BRANCH_AND or BRANCH_OR instruction. A BRANCH_AND instruction can include the instructions given to the database engine to process an "AND" operation in a query. A BRANCH_OR instruction can include the instructions given to the database engine to process an "OR" operation in a query. The BRANCH_AND_CNT and BRANCH_OR_CNT can include the same instructions as a BRANCH_AND or BRANCH_OR, respectively, but may also include instructions for counting features of the branch flow.

The threshold value used by the expression counter or evaluation counter value may be dynamically calculated based on a specified fraction of the table rows or number or rows used by the query, hard coded, or assigned by a database developer. The threshold value may be a large enough number, like 5000, to give a statistically relevant sample of the table used in the query expression. The evaluation counter value may be incremented with a seen-counter for a predetermined predicate of the query expression, like the first predicate evaluated, since the seen-counter for the first predicate and the expression counter or evaluation counter value may have the same value. The expression counter may be incremented when each row in a database table is accessed.

Efficiency Calculations with Counters

In another embodiment, an evaluation counter may be used to increment a seen counter value or a taken counter value for each predicate in a query expression. The database engine may use the predicate seen counter value and taken counter values in the determination of predicate efficiency and subsequent reordering.

The predicate cost may be used in conjunction with predicate efficiency to achieve optimal efficiency. The predicate cost may be assigned prior to or calculated at compile-time, or calculated through a predicate timer at run-time. Predicate cost may be assigned or calculated for each database operator, predicate operator, or predicate operation. Predicate operations may include arithmetic, logical, compares, moves, branches, or a variety of other operations used to filter columns in rows.

The query processor of the database engine may be used to evaluate the efficiency of the predicate order for reordering the predicates in the query expression after a flag is set in the database engine. The evaluation and reordering of the query expression may be determined at run-time or during query execution. The efficiency may be evaluated by comparing each predicate's efficiency against the efficiency of the other predicates. Efficiency may be determined by the taken-counter, the seen-counter, or a combination of the taken-counter, seen-counter, and predicate cost. For example, the efficiency of a predicate or predicate group P may be defined as Equation 1 (below), where taken(P) is the taken counter value for each predicate in the query expression. In another embodiment, efficiency may be defined as Equation 2 (below), where taken(P) is the taken counter value and cost(P) is the cost value for each predicate in the query expression. In another configuration, efficiency may be defined as Equation 3 (below), where taken(P) is the taken counter value, seen(P) is the seen counter value, and cost(P) is the cost value for each predicate in the query expression.

$$\text{efficiency}(P) = \text{taken}(P) \quad \text{[Equation 1]}$$

$$\text{efficiency}(P) = \text{taken}(P)/\text{cost}(P) \quad \text{[Equation 2]}$$

$$\text{efficiency}(P) = [\text{taken}(P)/\text{seen}(P)] * [1/(\text{cost}(P))] \quad \text{[Equation 3]}$$

The database engine may reorder the predicates in the query expression in the order of the most efficient predicate first and the least efficient predicate last. The most efficient predicate may be a predicate with a highest taken counter value, and the least efficient predicate may be a predicate with the lowest taken counter value. In another embodiment, the most efficient predicate may be a predicate that has the greatest probability of causing an early exit of a query expression or predicate group, and the least efficient predicate may be a predicate that has the lowest probability of causing an early exit of a query expression or predicate group.

The evaluation of the query expression and reordering of the predicates may occur concurrently or in parallel on a first query processor while a second query processor continues running the query expression in the original order. After the predicates of a query expression have been reordered for optimization, the database engine may continue to run the query expression with reordered predicates.

Figure 8:
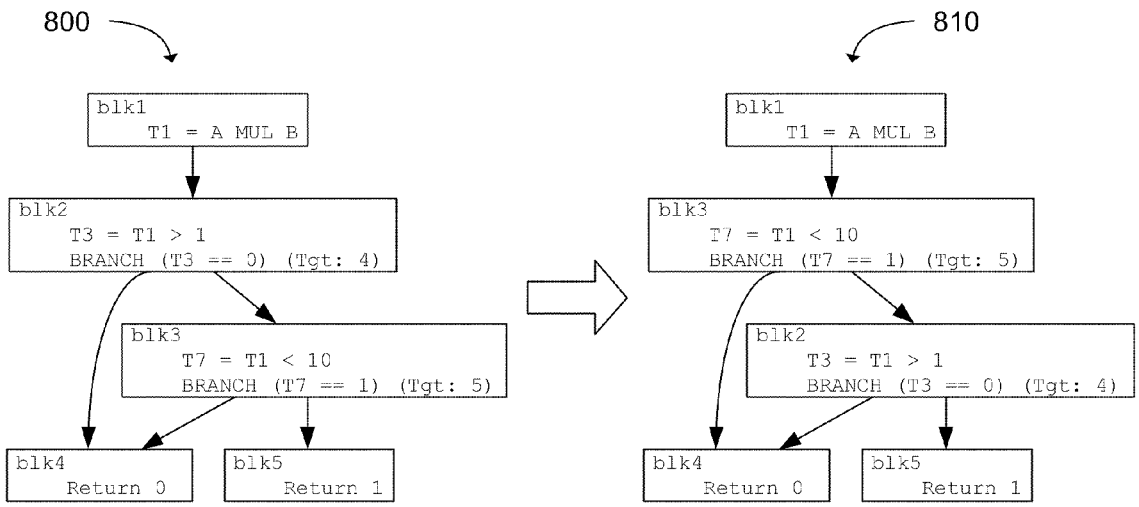
FIG. 8 is a block diagram illustrating predicate reordering in accordance with an embodiment.

FIG. 8 provides an example of dynamic reordering of predicates in a query based on efficiency for Q4 with query expression QE6 800 (below). Profiling the data in QE6 may result in "(A*B)>1" predicate being TRUE 90% of the time, and "(A*B)<10" predicate being TRUE 10% of the time. To spend as little time as possible in the expression evaluation engine within the database engine, the method and system may flip or reverse the predicate evaluation order of blk2 and blk3 so QE6 is transformed to QE7 810. Expression evaluation time may be reduced by over 25%, because "(A*B)<10" predicate may be more likely to result in an early exit. The final result or exit of the query expression may be represented by blk4 for FALSE and blk5 for TRUE.

---

SELECT * FROM TABLE4 WHERE (A*B) > 1 AND (A*B) < 10 [Q4]
(A*B) > 1 AND (A*B) < 10 [QE6]
(A*B) < 10 AND (A*B) > 1 [QE7]

---

Additional Example Embodiments

Any collection of user-defined statistics can use instrumented code for collecting data by the expression evaluation engine during execution. The dynamic optimization infrastructure may utilize the collected profile data and PCode instructions to optimize the expression. A counter may be maintained for the entry point of an expression, so the number of rows processed by the expression may be tracked.

The profiling data may be collected and stored within the PCode instruction space. A buffer may be provided for each expression to maintain profile data. The instruction space may be defined at compile-time and allocated at runtime. The compiler may determine the location of the profiling data, and so the information can be encoded in the PCode instructions, so that constant access to read/write profiling data results. Profile collection cost including processing delays may be negligible on parallel execution architectures because the cost of writing the data may be overlapped with the cost of actually evaluating the PCode instruction.

Runtime optimizations may be enabled or "triggered" once the expression has processed a specified number of rows. The number of rows may be determined by checking the entry counter after each row is processed. After the predetermined number of rows is evaluated, the query execution may freeze execution, and a dynamic optimization framework may be instantiated. The optimization infrastructure may take a PCode byte-stream as input for a particular expression and generates a control flow graph (CFG) by chunking up or consolidating the instructions into blocks and adding edges between them to represent the control flow. Read and write operands may be identified in each instruction.

A result of query expression optimization can adaptively optimize a query's performance at query execution time without query modification and without stored statistics. Typical database systems may have to first stop the running query, execute a database command to update statistics for all tables involved in the query, recompile the query, and then re-run. Query expression optimization using the described technology can be plug-and-play requiring zero user intervention.

The granularity of information covered by the profile collection facility can be specific to and flexible for the query. Relevant information regarding the behavior of the data or rows processed can be collected for subsequent analysis by a runtime optimization phase. The cost of adding counters to query execution may be negligible since the cost of incrementing a counter may be much less than performing an evaluation operation, like a multiply or divide that may be eliminated through optimization. When query expression optimization is implemented on a parallel processing architecture, the parallel nature of the system may allow for the profile collection facility to overlap other functionality.

In another embodiment, scan expressions generated by a database compiler, like a SQL/MX compiler, may contain where it is desirable to evaluate predicates in the exact order the query was written or represented. Significant performance can be achieved when the evaluation order of predicates is rearranged based on efficiency. Efficiency can be a calculation derived from cost and frequency. Predicates may be ordered by their selectivity as determined by the compiler optimizer's cardinality estimates.

Cost, Probability, Frequency, Efficiency, and Hit-Ratio

Not all predicates have the same execution cost during query runtime evaluation. For example, the cost of evaluating the predicate "(a<b)" in scan expression "(c>a*b) OR (a<b)" may be low because only two PCode instructions may be needed to load both "a" and "b" and then compare the two. The first predicate "c>a*b" may be more expensive to evaluate at runtime, because it may use three PCode instructions to perform three (3) loads, a multiply, an overflow checking for the multiply, and then finally the comparison before determining whether or not the predicate is TRUE.

For example, assuming a cost of evaluating the first predicate is 100, the cost of evaluating the second predicate is 50, and both predicates may have an equal probability to return TRUE or FALSE when evaluated. The cost of evaluating scan expression "(c>a*b) OR (a<b)" may be represented as CE1.

"((c>a*b) OR (a<b))"=(0.50*100)+(0.50*(100+50))=125 [CE1]

The cost of evaluating the second predicate may include the cost of evaluating the first predicate since the first predicate can always be evaluated regardless of whether the first predicate evaluates to TRUE or FALSE. Rearranging the order in which the CE1 predicates are evaluated, the second predicate "a<b" may be evaluated first, resulting in cost represented by CE2.

"((a<b) OR (c>a*b))"=(0.50*50)+(0.50*(50+100))=100 [CE2]

Varying the order of execution based on operation cost with other predicate efficiency factors being held constant and evaluating the cheaper comparison predicate first may result in an overall better performance for the scan expression.

Not all predicates may have equal probability in evaluating to TRUE or FALSE. For example, assume each predicate has an equal cost of 50 in scan expression "(a<b) AND (b>c)". Assume that for all rows processed by the scan expression, the first predicate "(a<b)" evaluates to TRUE all of the time, whereas the second predicate "(b>c)" evaluates to TRUE only half the time. The cost to evaluate the scan expression can be represented by CE3.

"((a<b) AND (b>c))"=1(50)+1(50+50)=150 [CE3]

Because of the frequency of evaluation both predicates may be evaluated for every row processed by the expression, resulting in the cost of 150. Rearranging the order such that the second predicate "b>c" is evaluated first, the cost to evaluate the scan expression can be represented by CE4.

"((b>c) AND (a<b))"=0.50(50)+0.50(50+50)=75 [CE4]

By evaluating the second predicate first, the scan expression can achieve better performance. The performance gain can be because of short-circuiting. By first scheduling those predicates more likely to result in an early exit from the expression, the cost of needlessly executing predicates which gets the evaluation no closer to exiting from the expression may be eliminated. With the scan expression in CE4, half of the rows processed exited the expression early after evaluating the first predicate, since short circuiting caused the evaluation of the second predicate to be skipped.

The executor in the database engine may make efficiency calculations better than the compiler. The executor can accurately determine the cost of a predicate because the executor can determine what PCode instructions may get generated for a predicate.

By collecting simple counts of how frequently a predicate evaluates to TRUE or FALSE at runtime, the complexity of predicates, like "c like '% abc %'", may be ignored since the TRUE or FALSE result may be recorded and used to determine efficiency. Selectivity determinations may be accurate since counts are collected from the rows processed by the expression. Query expression optimization may have no user or developer intervention or significant overhead used to collect the TRUE and FALSE counts.

A PCode optimization infrastructure may be used to provide query expression optimization in rearranging the evaluation order of predicates. Optimization may be done once during compilation and then several times at runtime if desired. A framework of identifying basic predicates in the scan expression, rearranging them according to cost, frequency, or both, and then joining or grouping them together into larger predicates may be used. The optimization process may be used recursively by starting the process over again until all that remains is a single predicate group.

Sample Embodiments of Query Optimization

A basic predicate group may be the lowest common denominator of a predicate. For example, for the expression "(a!=c) AND (a<b OR b>c)", the basic predicates may be "a!=b", "a<b", and "b>c", because the predicates may not be subdivided further. A predicate group may consist of one or many predicate or basic predicate groups. For example, predicate group "a<b OR b>c" may consist of 2 basic predicate groups. The scan expression as a whole may be a single, all-encompassing, predicate group. A predicate group may be referred to as a unit.

When using the PCode optimization infrastructure for optimization, predicate groups may be identified within the PCode byte-stream associated with the scan expression. A basic predicate group may not expand across a single block of PCode where a block of PCode can be defined as a sequence of PCode instructions where control flow can only come into the top of the block and exit from the bottom.

Figure 9:
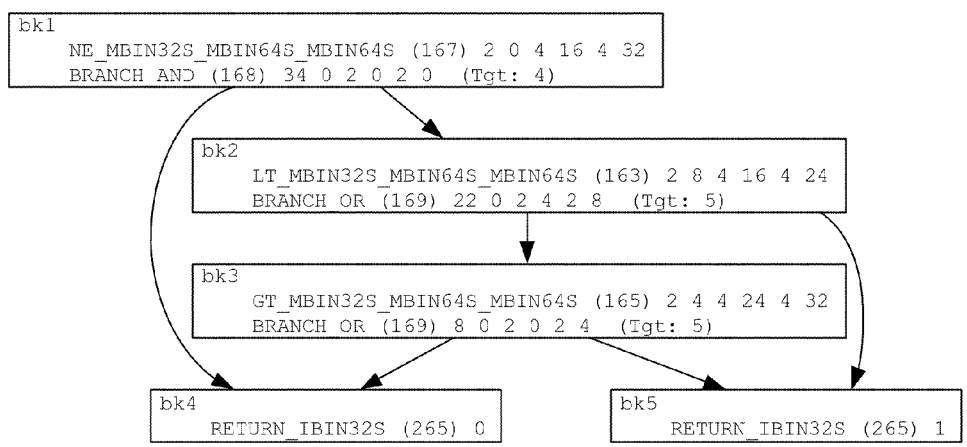
FIG. 9 is a block diagram illustrating predicate flow in accordance with an embodiment.

FIG. 9 provides an example of a scan expression with PCode subsections. Three distinct basic predicate groups, "(a!=b)", "(a<b)", and "(b>c)", can be represented by or identified in blocks bk1, bk2, and bk3, respectively.

Several conditions may apply for a block to be considered a basic predicate group. Three conditions may be: First, a block may terminate with a logical branch. Second, the block may not contain clauses which have side-effects. Third, data referenced within the block can come from a definition defined within the block or from a definition within the expression. The third condition ensures that the predicate may be position-independent so that any basic predicate group can be swapped with any another basic predicate group. After determining the basic predicate groups, if 1 or less groups are found, the optimization process may exit since a minimum of 2 groups may be needed for reordering to occur.

When basic predicate groups are found, a work list may be created with the basic groups as members. Basic predicate groups may be treated as normal predicate groups. An iterative algorithm may be invoked to traverse through the work list to discover and link sibling and family predicate groups. For example, a predicate group P1 may be an older sibling of predicate group P2 if: first, all paths to P2 go through P1, in other words P1 dominates P2; second, P1 exits early to either P2's target or fall-through block; third, P1 falls-through to P2 (in this case P1 may be referred to as an immediate older sibling of P2); or fourth, P1 is an older sibling of Px, and Px is an older sibling of P2.

In FIG. 9, blocks bk1, bk2, and bk3 can represent the 3 basic predicate groups. From the diagram, blocks bk2 and bk3 may be siblings because bk2 exits early to the same block as bk3's target block, notably bk5. Blocks bk1 and bk2 may not be siblings because bk1 does not exit early to either bk2's fall-through block (bk3) or target block (bk5). Since bk1 may not be a sibling of bk2, and since bk2 may be a sibling of bk3, bk1 may not be a sibling of bk3.

Identification of siblings may be identified visually. In some cases, the youngest sibling of a family may have a logical branch opcode that can be different from its other siblings. For example, the youngest siblings older brother's and sister's may have a BRANCH_OR that exits early to block X, and the youngest sibling may have a BRANCH_AND that falls-through to block X, and targets another block.

A finding routine may be used for finding the unit containing the predicate group. The finding routine may be a recursive function because the process of finding the predicate potentially may involve finding sub-units or predicates within the predicate. An invoking predicate group may invoke a finding routine, which may visit each predicate group in the work list, treat each predicate group as if it were the potential sibling, and determine if all predecessor edges into the sibling come from blocks defined in the invoking predicate group.

A potential sibling found may be verified to have a fall-through or target edge that exits early to the same block as the invoking predicate group. The fall-through edge may be used in a check if both the invoking predicate group and its siblings have the logical branches with different opcodes, otherwise a target edge may be used.

Once a complete unit is found, the unit may be processed for rearrangement. When each predicate group is added into the unit, the predicate group may be removed from the work list since the predicate group has been processed. A group leader of the unit may remain in the work list, because the group leader may be a sibling of a larger family unit.

Once all the siblings of a particular predicate group have been found and placed inside of a unit list, the query expression optimization may iterate through the unit list and determine the optimal arrangement of the predicate groups inside that unit. The algorithm or process may use efficiency, cost, or selectivity to swap one predicate group with another.

For example, a swap function may be called by a predicate group object to swap its position in the unit with one of its siblings. Swapping may fix up the edges of the blocks contained by both groups so that the control flow graph (CFG) properly reflects the swap. An invoking predicate group may call the swap function and a sibling of the invoking predicate group may be passed into the call.

In another configuration, the steps of swapping in the query expression optimization may include five steps that may be taken in any order. First, the swapping process may fix up predecessor edges to both predicate groups. Predecessor edges flowing into the invoking predicate group (older sibling or older predicate group) may flow into the sibling of the invoking predicate group (called predicate, younger sibling, or younger sibling group). The step may be taken for predecessor edges flowing into the younger predicate group. Two predicate groups adjacent to each other, such that the older sibling is an immediate dominator of the younger sibling, then the steps may be performed differently to ensure correctness.

Second, the swapping process may fix up interior nodes within both predicate groups. Each interior node of the younger predicate group may fix up that node's target edge so that the interior node points to either the older predicate group's fall-through block or target block. The interior node may be may be a block in a predicate group which may be neither the head nor the tail.

Third, the swapping process may fix up successor edges for both predicate groups. Successor edges flowing out of the older predicate group may become successor edges flowing out of the younger predicate group. The step may be repeated for successor edges flowing out of the younger predicate group.

Fourth, the swapping process may fix up logical branch opcodes for both predicate groups. Not all sibling blocks may have the same opcode for their logical branches. When a swap is made, the opcodes may get swapped to ensure proper opcodes for logical branches.

Fifth, the swapping process may perform entry block fix up. A reset function to reset the entry block may be used to point to the new entry block of the PCode when the PCode needs updating because of the swap.

After the predicates are reordered, the PCode CFG may be laid out into a byte-stream pointed to by the scan expression. The query expression optimization may overwrite the memory used to hold the old originally arranged PCode byte-stream with the optimally arranged PCode byte-stream. The swapping of the PCode byte-stream in memory may result in the equivalent amount of bytes used for each PCode.

The costing model used to determine whether or not predicate groups can be rearranged within a unit may differ based on if the optimization is performed statically at compile-time or dynamically at runtime. At compile-time, the cost of each predicate group may be factored into the determination. A dynamic optimization may consider both cost and frequency of early exits taken from a predicate group.

In a static solution configuration, predicates groups within a unit may be rearranged such that the predicate group with the lowest cost may be scheduled first within the unit or be first in the evaluation order followed by the predicate group with the second lowest cost, and so forth.

As discussed previously, each PCode instruction may have a cost associated with the instruction. For example, string computation instructions have the highest cost, whereas operations like DIV and MUL may have medium costs. Other instructions may have a lowest cost. Since a predicate group can consist of blocks of PCode instructions, the cost of a predicate group may be calculated by summing the cost of each PCode instruction contained in the group.

Figures 10, 11, 12:
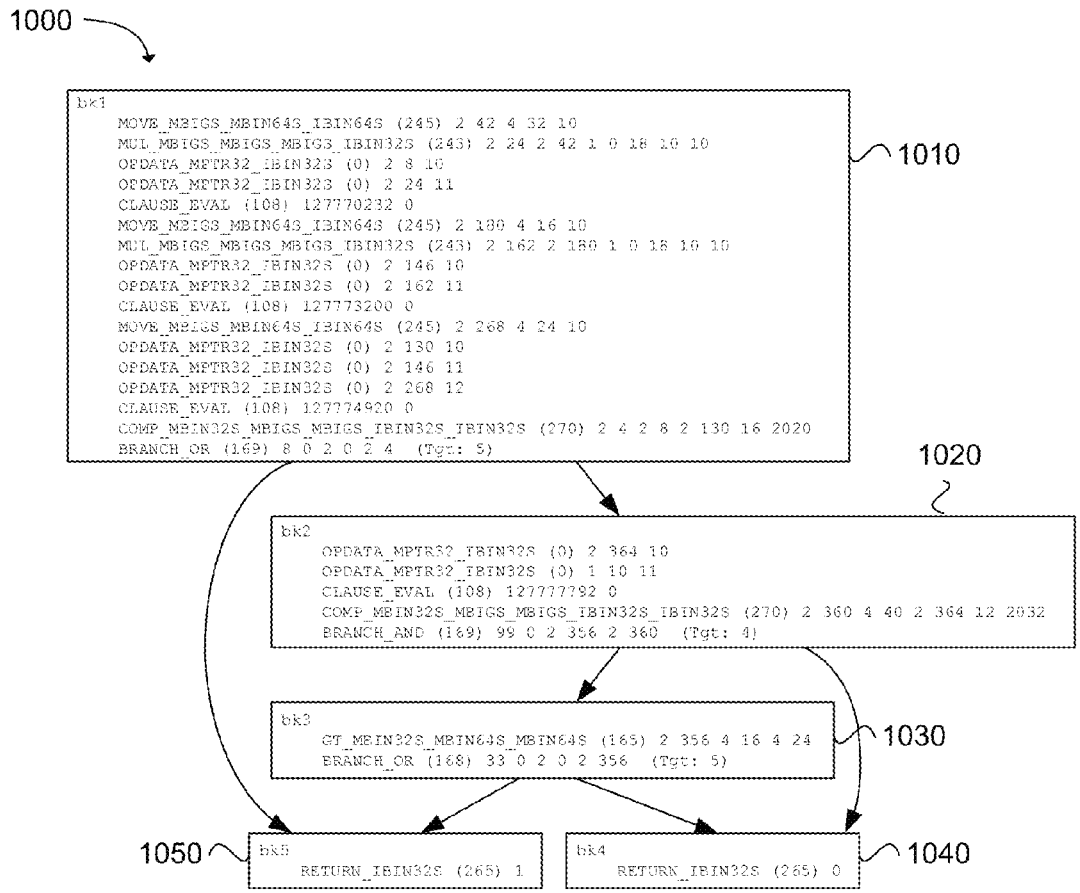
FIG. 10 is a block diagram illustrating predicate flow in accordance with an embodiment.
FIG. 11 is an illustration of a table of predicates with their cost values in accordance with an embodiment.
FIG. 12 is an illustration of a table of predicates with their cost values in accordance with an embodiment.

For example, scan expression QE8 1000 may be represented FIG. 10 with the costs of the basic predicate groups in a cost table shown in FIG. 11.

$$((c=a/b) \text{ OR } (bignum1<20 \text{ AND } a>b)) \quad \text{[QE8]}$$

The optimizing algorithm may first identify the unit including blocks bk2 1020 and bk3 1030 representing the predicate group "(bignum1<20 AND a>b)". Determining that the cost of "a>b" may be smaller than "bignum1<20", the optimization may swap the order of the two predicates, blocks bk2 and bk3.

Figure 13:
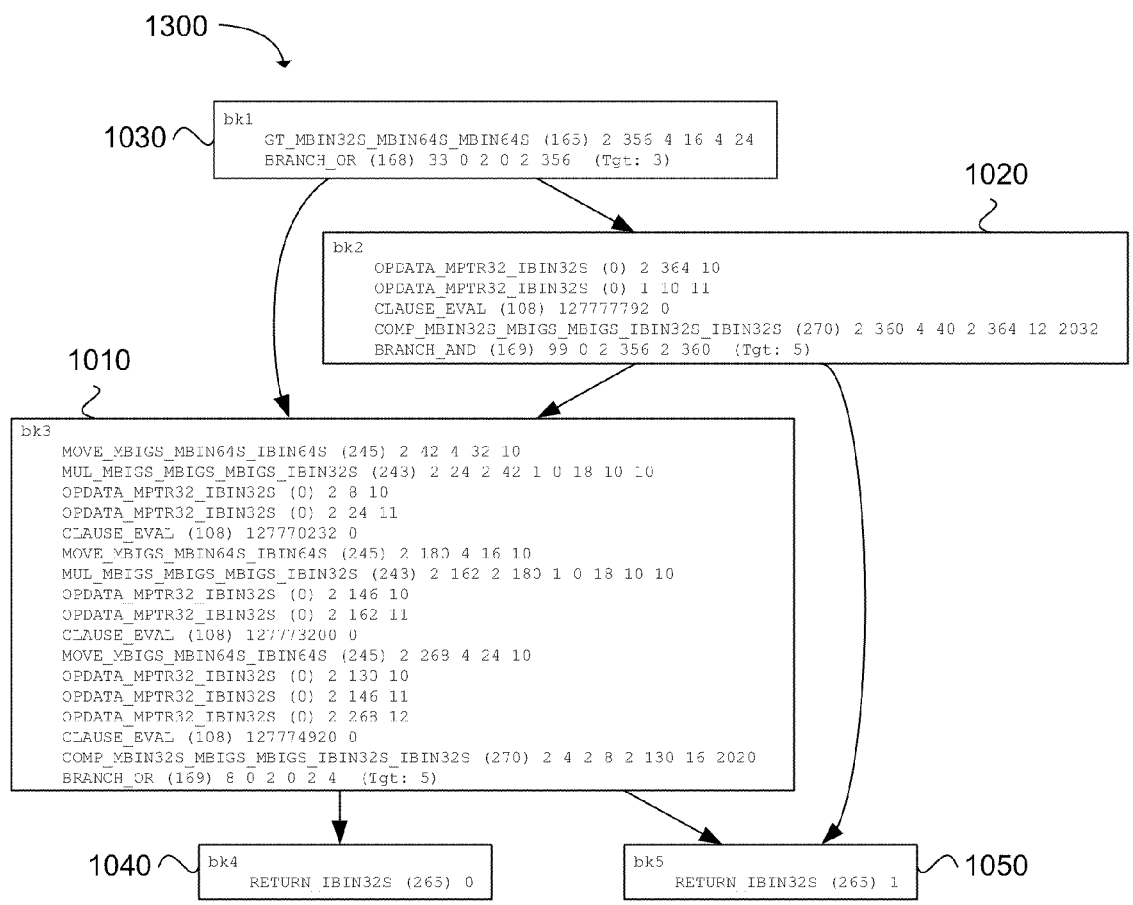
FIG. 13 is a block diagram illustrating predicate reordering in accordance with an embodiment.

The next unit processed by the optimization may contain the predicate groups for bk1 1010 and for combined bk2 and bk3. The cost table may be represented by FIG. 12. The two predicate groups in this unit may be swapped so that the cheaper predicate group may be executed first, represented in FIG. 13. The final targets for the unit 1300 may result in bk4 1040 or bk5 1050.

For example, costs of PCode instructions may have a lowest cost with a value of 1, medium cost with a value of 50, and the highest cost with a value of 100. Costs per predicate group may be rounded to the nearest integer. Alternately, costs per predicate group may be rounded to the nearest "X", where X is implementation-specific or the value of a medium cost instruction. A reason for setting or assigning cost may be so that swapping is only done for severe cases where the costs of executing the predicates may be so different that moving the least costly predicate higher up in the evaluation order may justify the optimization.

The dynamic optimization may not be limited to cost, and may be able to use efficiency to determine when predicate groups can be swapped in their evaluation order. The predicate with the highest efficiency can be evaluated first. The efficiency of a predicate may be determined by two factors: first, the execution cost of the predicate and second, the frequency of that predicate exiting its evaluation order early. The first executed predicate in the evaluation order may have the highest taken count, where the taken count may be directly associated with early exit at the lowest execution cost. Efficiency of a predicate group P may be defined as Equation 1, Equation 2, or Equation 3, discussed previously. Equation 3 may give a high efficiency rating to the predicate with the highest hit-ratio, such as the frequency in which the predicate was seen to exit early, and at the lowest cost.

FIG. 14 illustrates an efficiency table of the cost and count values of an execution of scan expression QE9.

$$((a<b) \text{ OR } (b>c) \text{ OR } (a=c)) \quad \text{[QE9]}$$

The last predicate, "a=c", may have a different logical branch instruction, such as BRANCH_AND_CNT, than its sibling predicates, which may have BRANCH_OR_CNT branch instructions. The raw taken counts collected for the last predicate may represent the predicate "a!=c". To correctly associate taken counts as early-exit counts, the effective taken count may be reset to be "seen count−taken count".

Based on the efficiency using Equation 1, the second predicate, "b>c", may be evaluated first, followed by "a<b", and then by "a=c". Based on the efficiency using Equation 2, the predicate "a=c" would be evaluated first because that predicate has the highest hit-ratio (90%). The hit-ratio may not be maintained after predicate "a=c" has been promoted to be evaluated first. The predicates may be mutually exclusive so rows which exit early with one predicate may not exit with the other predicate and vice-versa. By selecting the predicate with the highest taken count (Equation 1), like predicate "b>c" with a taken count of 70 in position 2, the predicate may exit early at least as many times (70) when moved to position 1 as in position 2.

The efficiency of a non-basic predicate group may be calculated similar to basic predicate group calculation. FIG. 15 represents an efficiency table with seen, taken, and cost fields for a scan expression QE10.

$$((bignum1>20) \text{ AND } ((a<b) \text{ OR } (b>c) \text{ OR } (a=c))) \quad \text{[QE10]}$$

Arranging the predicates "a<b", "b>c", and "a=c" of the second predicate group amongst themselves, one large predicate group or unit may be created from the three basic predicates. The seen count for the unit may be equal to the seen count of the first predicate group evaluated in the unit. The taken count for the unit as a whole may be the sum of taken counts for each predicate group in the unit, since swapping within the unit may not affect early exits across the entire unit. The cost for the unit may be calculated from projections made based on swapping performed between the child predicates of the unit.

In another configuration of calculating the cost of the unit as a whole, a projected taken count may be first calculated for each child predicate to account for the child predicates new position in the evaluation order. If none of the child predicates were swapped, then the new projected taken count may be the same as the predicate's original taken count. FIG. 16 reflects a change in the order of the second predicate group based on efficiency of QE10 in an efficiency table. Each hit-rate or hit-ratio may be calculated for each predicate. The seen, taken, and efficiency values may not be accurately stated in FIG. 16 because the values were calculated before swapping was performed.

The first predicate ("b>c") of the unit may use its original hit-ratio (88%) before the move and a seen count of the unit (100) to project a new taken count. For example, the new taken count for the predicate "b>c" may have a "hit-ratio*seen count" which equals 88. The first predicate may have the same seen count of a unit since the first predicate may be at the beginning of the unit and evaluates every row of the unit. The "b>c" predicate may be calculated or projected to exit early 88 out of the 100 times seen. So, the second predicate evaluated, "a<b", may be seen only 12 times (100−88) and have a seen count of 12. A similar computation for calculating the new taken count may be performed for the "a<b" predicate. FIG. 17 may illustrate a new projected-based efficiency table.

The last predicate ("a=c") in the table of FIG. 17 may have a better efficiency than the "a<b" predicate evaluated earlier. A side-effect of the heuristic which factors in the hit-ratio may occur depending on the efficiency used in making projections in swapping and on what the new taken count will be after any swapping.

From the reordered projection, the optimizer may calculate the cost of the unit as a whole, and how many early exits the unit may see. The cost may be computed as a weighted average across the unit, so that the cost may represent the average cost paid whenever the unit as a whole is evaluated. The cost may be represented by CE5 and illustrated in FIG. 18.

$$(((100*1)+(12*1)+(9*1))/100)=2 \text{ (rounded up)} \quad \text{[CE5]}$$

The two predicate groups in CE5 may form a unit and swapping may be performed based on efficiency. In this case, the two groups may be swapped because the second predicate group has an efficiency (50) greater than the first predicate efficiency (18). The final cost and counts of this new unit may be computed.

In another embodiment using an alternate heuristic, the taken counts per predicate group within the unit may not be projected to result in any value more (or any value less) within the unit during a swap. The taken projection may represent an upper-bound since re-execution of the modified expression may result in at least the same number of taken counts per predicate higher in the evaluation order, and less taken counts per predicate lower in the evaluation order. FIG. 19 represents a cost table where the actual taken count forms an upper limit on efficiency in a projection. The heuristic may have a lower efficiency than the heuristic in use in CE5 and FIGS. 17 and 18, but the cost of the unit may remain higher.

The cost of the unit may be a weighted average of the cost of the predicate groups in the unit represented by CE6. The cost of a unit computed by the different heuristics may produce a similar result due to rounding, like CE5 and CE6.

$$(((100*1)+(30*1)+(10*1))/100)=2. \qquad [CE6]$$

Figure 20:
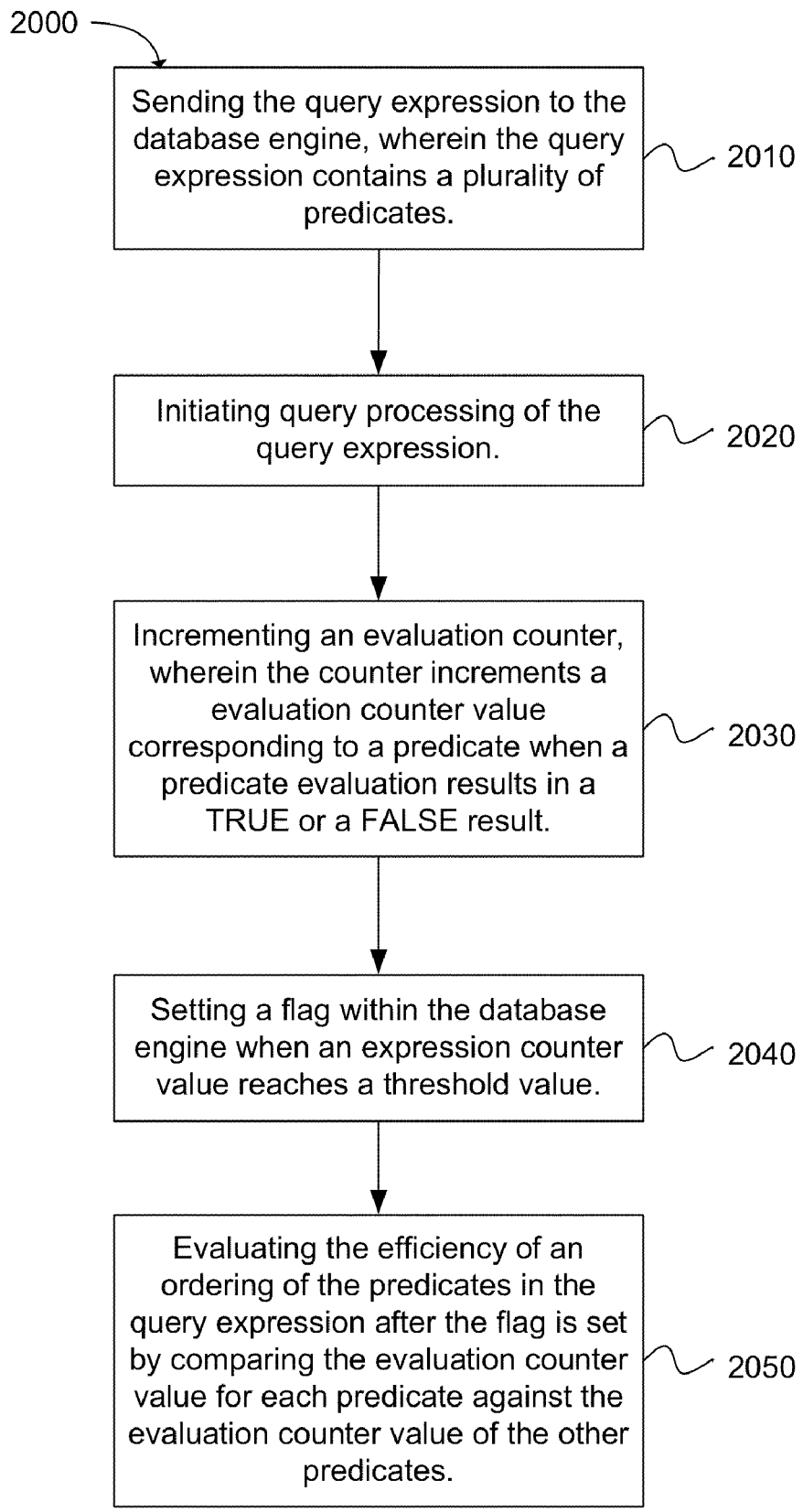
FIG. 20 is a flowchart illustrating an optimization of a query expression on a database engine of a database server in accordance with an embodiment.

Another embodiment provides a method 2000 for optimizing a query expression on a database engine of a database server, as shown in the flow chart in FIG. 20. The method includes the operation of sending 2010 the query expression to the database engine. The query expression contains a plurality of predicates. The operation of initiating 2020 query processing of the query expression follows. The next operation of the method may be incrementing 2030 an evaluation counter. The counter may increment an evaluation counter value corresponding to a predicate when a predicate evaluation results in a TRUE or a FALSE (i.e., Boolean) result.

The method 2000 further includes setting 2040 a flag within the database engine when an evaluation counter value reaches a threshold value. After setting a flag, the operation of evaluating 2050 the efficiency of an ordering of the predicates in the query expression by comparing the evaluation counter value for each predicate against the evaluation counter value of the other predicates can be performed.

Another configuration provides a method for optimizing a query expression on a database engine of a database server. The method includes the operation of sending the query expression to the database engine. The query expression contains a plurality of predicates. The operation of initiating query processing of the query expression follows. The next operation of the method may be incrementing a seen counter value when a first predicate is when a branch of the first predicate is taken. The branch may be determined by evaluating the first predicate, and the branch may evaluate a second predicate or exits the query with a result. The next operation of the method may be setting a flag within the database engine when the seen counter value reaches a threshold value. After setting a flag, the operation of reordering the predicates in the query expression in order of a most efficient predicate with a greatest probability of an early exit of the query expression evaluated first and a least efficient predicate with a lowest probability of an early exit of the query expression evaluated last in the query expression can be performed. The greatest probability of an early exit in reordering the predicates may be determined by a highest predicate taken counter value, and lowest probability of an early exit may be determined by a lowest predicate taken counter value. The result may evaluate to a Boolean result (i.e. TRUE or a FALSE result).

The method and system for optimizing a query expression on a database engine of a database server may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data. Additionally, the method and system for optimizing a query expression on a database engine of a database server may be downloaded as a computer program product transferred from a server or remote computer to a requesting or client device by way of machine readable data signals embodied in a carrier wave or other propagation medium.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for optimizing execution of a query expression on a database engine of a database server, comprising:
   a computer processor;
   a database engine on a database server for receiving the query expression with a plurality of query language elements;
   an evaluation counter module within the database engine, wherein the evaluation counter module increments an evaluation counter value corresponding to a query language element result;
   a flag within the database engine, wherein the flag is configured to be set in the database engine when the evaluation counter value reaches a threshold value;
   a seen counter module within the database engine, wherein the seen counter module increments a seen counter value corresponding to each of the query language elements when a query language element is evaluated;
   a cost value module within the database engine, wherein the cost value module assigns a cost value to each of the query language elements determined by a duration of time that a query processor uses to evaluate each query language element; and
   a module that reorders query language elements in the query expression in order of a most efficient query language element with a greatest probability of an early exit of the query expression evaluated first and a least efficient query language element with a lowest probability of an early exit of the query expression evaluated last in the query expression, wherein query language element efficiency is defined as the evaluation counter value divided by a product of the seen counter value and the cost value.

2. The system of claim 1, wherein the query language element evaluation results in a Boolean result.

3. A computer implemented method for optimizing a query expression on a database engine of a database server, comprising:
   sending, by the computer, the query expression to the database engine, wherein the query expression contains a plurality of predicates;
   initiating, by the computer, query processing of the query expression;
   incrementing, by the computer, an evaluation counter, wherein the counter increments an evaluation counter value corresponding to a predicate when a predicate evaluation results in a Boolean result;
   setting, by the computer, a flag within the database engine when the evaluation counter value reaches a threshold value;

incrementing, by the computer, a seen counter, wherein the seen counter increments a seen counter value corresponding to each of the plurality of predicates when a predicate is evaluated;

assigning, by the computer, a cost value to each predicate of the plurality of predicates determined by a duration of time that a query processor uses to evaluate each predicate; and reordering, by the computer, predicates in the query expression in order of a most efficient predicate with a greatest probability of an early exit of the query expression evaluated first and a least efficient predicate with a lowest probability of an early exit of the query expression evaluated last in the query expression, wherein predicate efficiency is defined as the evaluation counter value divided by a product of the seen counter value and the cost value.

4. The method of claim 3, wherein the evaluation counter increments the evaluation counter values for the plurality of predicates and sets the flag using instrumented code.

5. The method of claim 3, further comprising reordering the predicates in the query expression in order of a most efficient predicate with a highest evaluation counter value evaluated first in the query expression and a least efficient predicate with a lowest evaluation counter value evaluated last in the query expression.

6. The method of claim 3, further comprising continuing to run the query with reordered predicates in the query expression.

7. The method of claim 3, wherein reordering the predicates in the query expression uses an intermediate code that is interpreted by an evaluation engine at runtime.

8. The method of claim 3, wherein reordering the predicates in the query expression uses a database machine code evaluated by a query processor.

9. The method of claim 3, further comprising reordering, by the computer, an evaluation order of predicates in the query expression in order of a second predicate efficiency, wherein the second predicate efficiency is defined as the evaluation counter divided by the cost value.

10. The method of claim 3, wherein the evaluation counter value is the seen counter value for a predetermined predicate of the query expression.

11. The method of claim 3, wherein incrementing the evaluation counter value increments when each row in a database table is accessed.

12. The method of claim 3, further comprising continuing to run the query on a first query processor while evaluating the efficiency of an ordering of the predicates in the query expression on a second query processor.

13. The method of claim 3, wherein evaluating the efficiency of an ordering of the predicates in the query expression is evaluated during query execution.

14. A computer implemented method for optimizing a query expression on a database engine of a database server, comprising:

sending, by the computer, the query expression to the database engine, wherein the query expression contains a plurality of query language elements;

initiating, by the computer, query processing of the query expression;

incrementing, by the computer, an evaluation counter, wherein the counter increments an evaluation counter value corresponding to a query language element when a specified query language element evaluation results;

setting, by the computer, a flag within the database engine when the evaluation counter value reaches a threshold value;

incrementing, by the computer, a seen counter, wherein the seen counter increments a seen counter value corresponding to each of the query language elements when a query language element is evaluated;

assigning, by the computer, a cost value to each of the query language elements determined by a duration of time that a query processor uses to evaluate each query language element; and reordering, by the computer, query language elements in the query expression in order of a most efficient query language element with a greatest probability of an early exit of the query expression evaluated first and a least efficient query language element with a lowest probability of an early exit of the query expression evaluated last in the query expression, wherein query language element efficiency is defined as the evaluation counter value divided by a product of the seen counter value and the cost value.

15. The method of claim 14, wherein the query language elements are selected from the group consisting of predicates, nulls, columns, constants, indexes, keys, sub-queries, expressions, and combination thereof.

* * * * *

UNITED STATES PATENT AND TRADEMARK OFFICE
CERTIFICATE OF CORRECTION

| | | |
|---|---|---|
| PATENT NO. | : 8,204,873 B2 | Page 1 of 1 |
| APPLICATION NO. | : 12/548352 | |
| DATED | : June 19, 2012 | |
| INVENTOR(S) | : Shasank K. Chavan et al. | |

It is certified that error appears in the above-identified patent and that said Letters Patent is hereby corrected as shown below:

In column 17, line 44, delete "is" and insert -- is evaluated. The method further includes incrementing a taken counter value --, therefor.

Signed and Sealed this
Fifteenth Day of January, 2013

David J. Kappos
*Director of the United States Patent and Trademark Office*